United States Patent Office 2,829,948
Patented Apr. 8, 1958

2,829,948

METHOD OF CHLORINATING CARBIDIC FURNACE PRODUCTS

Andrew T. McCord, Snyder, N. Y., assignor, by mesne assignments, to the United States of America as represented by the United States Atomic Energy Commission No Drawing. Application August 2, 1954
Serial No. 447,426

3 Claims. (Cl. 23—87)

This invention relates to a process of carrying out inorganic chlorinations and more particularly it pertains to the chlorination of impure inorganic carbidic furnace products such as impure metallic carbides, carbonitrides, cyanonitrides or the like. The present inveniton has been applied with highly satisfying results to the chlorination of impure zirconium carbonitride furnace products and will primarily be described herein as it has been applied to the making of zirconium tetrachloride therefrom.

Common sources of zirconium are the ores baddeleyite, zirkite and zircon, all of which are oxidized forms of zirconium together with more or less silica which may be chemically combined with the zirconium as the silicate and/or may be physically admixed as a silica impurity, and other lesser impurities such as iron, titanium and the like. The chlorination of such zirconium oxidic ores takes place only with difficulty, requiring the use of substantial amounts of external heat in order to maintain the chlorination reaction. Consequently it has been found that the chlorination of zirconium oxide or zirconium silicate is none too efficient. As a result, in order to bring about an efficient chlorination of zirconium compounds to form the tetrachloride the customary practice has been to first furnace a mixture of the selected zirconium ore such as baddeleyite, zirkite or zircon with the desired amount of carbon in an electric arc furnace. The zirconium is thereby reduced to a carbidic form which is believed to be under most conditions a mixture of zirconium carbide and zirconium nitride although it is variously referred to as the carbide, cyanonitride and carbonitride. Such furnace products will be referred to herein as the "carbonitride." Substantial amounts of the silica and lesser impurities of the original zirconium ore are removed in the process of forming the carbidic furnace product. However, the furnacing operation when carried out upon a large scale in commercial operations is subject to considerable variation in the composition of the final carbonitride furnace product and especially in the amount of zirconium oxide produced or remaining in the material. The final carbonitride may contain anywhere from 2% unreduced zirconium oxide up to as much as 20% or more of zirconium oxide depending upon the specific conditions and period of the furnacing operation. The following are representative analyses of the various grades of zirconium carbonitride furnace products obtained in the course of day to day commercial operations and show the wide variation in oxide content.

|  | Top Grade, percent by wt. | Average Grade, percent by wt. | Poor Grade, percent by wt. |
|---|---|---|---|
| Total carbon | 8 | 7 | 5 |
| Total nitrogen | 3.0 | 2.8 | 2.0 |
| Zirconium as carbonitride | 83.0 | 74.0 | 66.0 |
| Zirconium oxide | 2.7 | 12.8 | 22.0 |

Such unreduced zirconium in the form of zirconium oxide or zirconium silicate in the carbonitride or other carbidic furnace product has been found to be very difficult to chlorinate under conditions where effective chlorination of the carbonitride occurs. As a result the unchlorinated residue in chlorinating average carbonitride material normally amounts to around 15% or more of the total raw batch. This unchlorinated material, most of which is found to be zirconium oxide or silicate in common practice is removed periodically after relatively short periods of chlorination from the reaction or chlorination chamber and returned to be refurnaced with additional ore and carbon to convert it to carbonitride. Heretofore, numerous investigators have attempted to eliminate or reduce the amount of this unchlorinated oxide residue in the chlorination of zirconium carbonitride furnace products. Nevertheless, large scale operations using a commercial carbonitride furnace product have invariably been confronted with the problem of the accumulation of unreacted residue in the chlorination chamber, requiring frequent stoppage of operations for removal of the residue. Due to the elevated temperature of the reaction chamber and the unavoidable seepage of air into the chlorinating chamber when the residue is being removed, further oxidation of the contents of the chlorinating chamber takes place and is a further aggravation of the problem because zirconium carbide and zirconium nitride burn easily in air at 600° C. to yield zirconium oxide.

It is an object of the present invention to provide an improved process of chlorinating impure carbidic furnace products whereby the amount of unchlorinated residue from the reaction is greatly reduced.

It is a further object of the present invention to provide a more efficient method of chlorinating carbidic furnace products such as zirconium carbonitride and the like.

Other objects and advantages accruing from the practice of the present invention will become apparent as the description herein proceeds.

I have found that when a small amount, such as around 2% by weight, of carbonaceous material, preferably petroleum coke, is mixed with the raw batch feed material or otherwise introduced to the chlorinating chamber as part of the charge virtually no unchlorinated residue results with almost all the raw batch charge, including the heretofore unreacted or oxidic impurity, being chlorinated. For example, during a period of one week's operations wherein about 7,000 pounds of zirconium carbonitride were fed to the chlorinating chamber and approximately 2% by weight of petroleum coke based upon the weight of the raw batch of carbonitride furnace product was added before the addition of each raw batch charge of carbonitride to the reaction chamber, the amount of residue of unreacted or unchlorinated material requiring removal at the end of the week's run amounted to only 5 to 10 pounds, this being less than 0.14% by weight of the total raw batch charge during the entire week's operations. This almost entire elemination of unreacted residue from the chlorinating operation is extremely favorable as compared to past experiences with unreacted residue prior to the addition of the step of adding 2% of carbon to the raw batch. By comparison, previous operation of the same chlorinator without the addition of coke or other form of carbon with the raw batch of carbonitride required that residue in the bottom of the chlorinator be cleaned out once or twice every 24 hours. The residue over a period of a week's operations amounted to several hundred pounds. If this residue is not removed it becomes increasingly more difficult to feed chlorine to the chlorinator. By the addition of the coke or other carbon substantially the entire residue is now converted to chloride and the operation has been rendered much more continuous, being interrupted for removal of residue only once in two or three weeks.

As has been already stated, the amount of oxide contamination in these carbide furnace products, such as zirconium carbonitride, varies considerably. In some instances the zirconium oxide content is only a few per cent whereas in other lots of the carbonitride furnace product the unreduced zirconia content amounts to as much as 20% or more of the carbide furnace product. It is difficult to control the arc furnace to produce low oxide material continuously. If too much carbon is added to the arc furnace charge a product high in carbon, low in nitrogen is produced which is difficult to chlorinate. All these various grades of zirconium carbonitride furnace product have been chlorinated with substantially the same efficiency of results in accordance with the herein described practice wherein a small percentage of coke or other carbon material is added to the raw batch charge as it is introduced into the chlorinator. Obviously, the exact amount of supplemental carbon which should be added in accordance with the herein described practice depends upon the amount of unreduced or oxidic material present in the carbonitride furnace product, but on the average will usually amount to around 2% coke or other carbon material, although excess carbon up to 4% does not interfere with the operation. The carbonitride furnace products containing lesser oxide impurities will naturally require even smaller amounts of supplemental coke in order to effect satisfactory and effective chlorination with very little unreacted oxide residue whereas those containing higher amounts of oxidic impurities require somewhat higher amounts of carbon additions.

The addition of free carbon to the zirconium carbonitride raw batch in the chlorinating chamber results in the following advantages:

(1) More complete chlorination of the carbonitride furnace product.
(2) Greater yield of chloride per pound of raw batch.
(3) Higher production per day per operating unit.
(4) Less manual labor to maintain the chlorinator in working condition.
(5) Reduction in the amount of unreacted residue requiring refurnacing.

Although the present invention has been almost entirely described as it pertains to the chlorination of zirconium carbonitride and the like carbidic or reduced compounds of zirconium containing varying percentages of oxide impurities, it is similarly applicable to the furnacing of various carbidic furnace products of the ores of titanium, silicon, boron, aluminum and the like for the purpose of reducing or eliminating the frequent and costly shutdowns and cleanouts heretofore required for the removal of unreacted residues.

Having described the invention, it is desired to claim:

1. In the process of chlorinating a previously prepared impure zirconium carbonitride containing unreacted oxidic material to form zirconium tetrachloride, the step of adding a small but effective amount of carbon to a raw batch of the aforesaid impure zirconium carbonitride to effect a completion of the chlorinating reaction whereupon when the zirconium carbonitride is chlorinated, the amount by weight of unchlorinated residue is reduced to a fractional percent of the charge.

2. The process of reducing the amount of unchlorinated residues in the chlorination of previously prepared oxide-contaminated zirconium carbonitride which comprises adding about 2% of carbon to a raw batch of the aforesaid zirconium carbonitride added to the chlorinating chamber.

3. In the process of chlorinating a charge of previously prepared zirconium carbonitride containing zirconium oxide, the step of adding a small but effective amount of supplemental free carbon to the charge whereby the major part of the zirconium oxide is chlorinated along with the carbonitride.

References Cited in the file of this patent
UNITED STATES PATENTS

| | | |
|---|---|---|
| 1,376,161 | Pugh | Apr. 26, 1921 |
| 1,582,126 | Cooper et al. | Apr. 27, 1926 |

OTHER REFERENCES

"Fiat Final Report 774," pages 18 and 19. Received by U. S. Pat. Off. Scientific Lib. Oct. 7, 1947.

"High Temperature Experiments with Zirconium and Compounds," by W. J. Krall, W. R. Cormody and A. W. Schlecten, pages 2–5. U. S. Department of the Interior, November 1952, Bureau of Mines, Report of Investigations 4915.